Jan. 29, 1924.
J. HAMMERL
1,481,836
CURTAIN LIGHT FOR MOTOR VEHICLES
Filed April 9, 1919
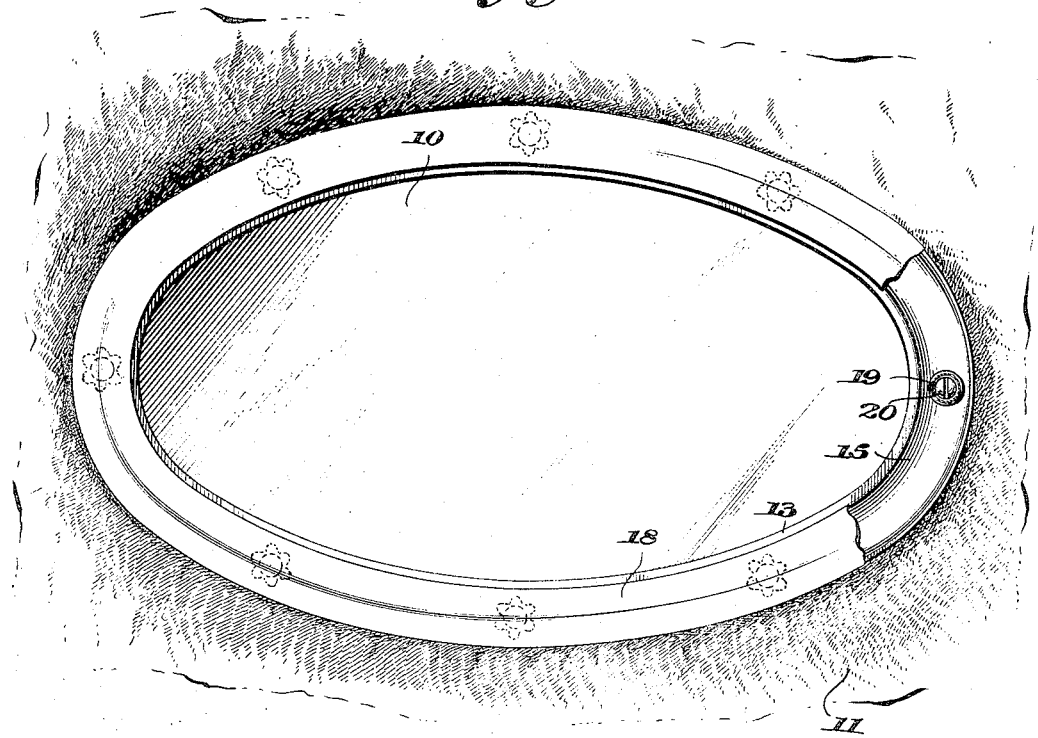
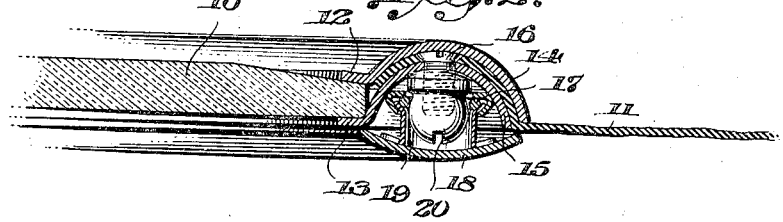
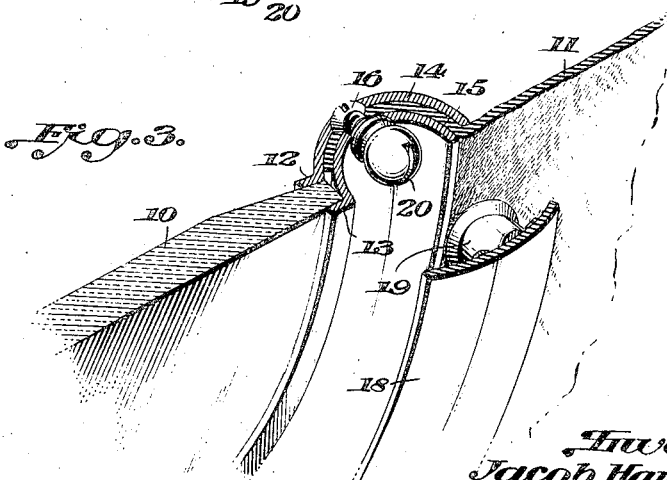
Inventor,
Jacob Hammerl,
By Milton Sibbets, Atty.

Patented Jan. 29, 1924.

1,481,836

UNITED STATES PATENT OFFICE.

JACOB HAMMERL, OF DETROIT, MICHIGAN, ASSIGNOR TO PACKARD MOTOR CAR COMPANY, OF DETROIT, MICHIGAN, A CORPORATION OF MICHIGAN.

CURTAIN LIGHT FOR MOTOR VEHICLES.

Application filed April 9, 1919. Serial No. 288,682.

*To all whom it may concern:*

Be it known that I, JACOB HAMMERL, a citizen of the United States, and resident of Detroit, Wayne County, State of Michigan, have invented certain new and useful Improvements in Curtain Lights for Motor Vehicles, of which the following is a specification.

This invention relates to motor vehicles and particularly to curtain lights for such vehicles. The object of the invention is to provide a construction of the metallic frame for holding the pane to the curtain fabric, in which a neat and finished appearance shall be given to the frame upon each side of the curtain, in which the attaching screws shall be entirely concealed on both sides of the frame, in which it will be possible to dispense with the employment of a lining separate from the main fabric of the curtain to provide an interior finish for the frame and in which the means providing the above construction and finish are simple of manufacture and capable of being readily assembled.

With the above objects in view the invention is embodied in preferable form in the construction and arrangement hereinafter described and illustrated in the accompanying drawings, in which:

Fig. 1 is a view in elevation of the interior of a rear curtain of a motor car showing a curtain light having a glass pane therein and having the invention applied to the frame adapted to hold said pane;

Fig. 2 is a cross section through the frame, and;

Fig. 3 is a perspective view showing, partly in section, the finishing member separated from the frame and curtain.

Referring to the drawings, 10 indicates the pane of glass adapted to be inserted in the body of the curtain 11. This pane is clamped between the two opposing flanges 12 and 13, respectively, of two metallic frame members 14 and 15 which are outwardly curved or convex on the surfaces thereof that lie outside of the curtain and concave on their inner faces. These members not only constitute the holding means for the pane but also means for engaging the body of the curtain 11 which is made in a single woven body of fabric and has its border portion surrounding the window inserted between the two members 14 and 15 and clamped thereby. The parts 14 and 15 consist preferably of endless bands. They are adapted to be drawn toward one another and against the pane and the curtain fabric by means of screws 16, the heads of which are adapted to be sweated or otherwise permanently secured to the inner surface of the outer frame member 14 so as to be concealed thereby. The shank of the screw extends through the member 15 and is adapted to receive a combined nut and stud member 17 which is threaded on the screw after the two members have been placed together and serves to exert sufficient pressure upon the inner surface of the inner member 15 to clamp the frame members tightly against the pane and the fabric.

In order to cover the frame member 1 and conceal the stud nuts 17 and thereby obtain an attractive finish for the interior of the frame, an endless metallic band 18 is provided which is preferably convex on the surface projecting toward the interior of the motor vehicle. This band is provided on its inner surface with spring sockets 19 of the construction customarily employed in the sockets of resilient glove fasteners and which are adapted to engage and be retained by spherical heads of the studs 17. By this arrangement the finishing plate or band 18 may be readily applied to the frame to serve as means for concealing the studs and the surface of the member 15, and at the same time gives a decorative finish to the exterior surface thereof. The head of the stud is provided with a slot 20 adapted to be engaged by a screw driver to enable the nut to be tightened on the screw.

Having thus described my invention what I desire and claim by Letters Patent is:

1. In a curtain light, metallic pane and fabric clamping members, a screw connecting said members, having an inwardly projecting shank, a threaded stud on said screw, and a finishing member adapted to cover a face of said clamping members, and having spring socket means to engage said stud.

2. In a curtain light, metallic pane and fabric clamping members constituting a frame, screws having their heads attached to the inner surface of the outer member, nuts on the screws beyond the inner surface of the inner member and having studs, a finishing band covering the inner face of the frame and spring socket members carried on the inner face of said finishing band and engaging said studs.

In testimony whereof I affix my signature.

JACOB HAMMERL.